(12) United States Patent
Kim

(10) Patent No.: US 12,545,971 B2
(45) Date of Patent: Feb. 10, 2026

(54) HIGH-STRENGTH COLD-ROLLED ENAMEL STEEL SHEET WITH EXCELLENT ADHESION, AND METHOD OF MANUFACTURING SAME

(71) Applicant: POSCO Co., Ltd, Pohang-si (KR)

(72) Inventor: Jaiik Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 348 days.

(21) Appl. No.: 18/268,143

(22) PCT Filed: Dec. 15, 2021

(86) PCT No.: PCT/KR2021/019098
§ 371 (c)(1),
(2) Date: Jun. 16, 2023

(87) PCT Pub. No.: WO2022/131795
PCT Pub. Date: Jun. 23, 2022

(65) Prior Publication Data
US 2024/0052452 A1    Feb. 15, 2024

(30) Foreign Application Priority Data
Dec. 18, 2020 (KR) .................. 10-2020-0178477

(51) Int. Cl.
*B32B 15/04* (2006.01)
*B32B 17/06* (2006.01)
(Continued)

(52) U.S. Cl.
CPC ............... *C21D 9/46* (2013.01); *C21D 6/005* (2013.01); *C21D 6/008* (2013.01); *C21D 8/0205* (2013.01);
(Continued)

(58) Field of Classification Search
CPC .............................. C21D 8/0236; C22C 38/00
(Continued)

(56) References Cited

U.S. PATENT DOCUMENTS

| 12,331,373 B2 * | 6/2025 | Kim ..................... C21C 7/00 |
| 2010/0040872 A1 * | 2/2010 | Murakami ............. C22C 38/04 |
| | | 148/648 |

(Continued)

FOREIGN PATENT DOCUMENTS

| CN | 101517115 A | 8/2009 |
| CN | 102747309 A | 10/2012 |

(Continued)

OTHER PUBLICATIONS

International Search Report dated Apr. 13, 2022, issued in International Patent Application No. PCT/KR2021/019098 (with English translation).

(Continued)

*Primary Examiner* — Lauren R Colgan
(74) *Attorney, Agent, or Firm* — Morgan Lewis & Bockius LLP

(57) ABSTRACT

The present invention relates to a high-strength cold-rolled enamel steel sheet and a method of manufacturing same, the enamel steel sheet comprising, in weight %, C:0.01-0.1%, Mn:0.05-0.4%, Si:0.001-0.03%, Al:0.03-0.12%, P:0.02-0.04%, S:0.001-0.02%, Cu: 0.03-0.08%, Mo:0.13-0.30%, N: 0.004% or less, 0:0.003% or less, and the balance being Fe and inevitable impurities, wherein the high-strength cold-rolled enamel steel sheet has an oxide layer with a thickness of 0.006-0.030 μm formed in an inward direction from the surface thereof and satisfies formulas (1) and (2), and thus has no bubble defects and excellent fish scale resistance and enamel adhesion after enamel treatment.

6 Claims, 2 Drawing Sheets

(51) Int. Cl.
*C21D 6/00* (2006.01)
*C21D 8/02* (2006.01)
*C21D 9/46* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/16* (2006.01)

(52) U.S. Cl.
CPC ......... *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/16* (2013.01)

(58) Field of Classification Search
USPC .......................................................... 428/702
See application file for complete search history.

(56) References Cited

U.S. PATENT DOCUMENTS

| 2013/0180632 A1* | 7/2013 | Cho | C22C 38/004 |
| | | | 72/200 |
| 2014/0000765 A1* | 1/2014 | Nozaki | C22C 38/06 |
| | | | 148/333 |
| 2014/0065434 A1* | 3/2014 | Van Steenberge | C21D 9/56 |
| | | | 148/320 |

FOREIGN PATENT DOCUMENTS

| CN | 110079731 A | 8/2019 |
| CN | 110777301 A | 2/2020 |
| JP | S56-41312 A | 4/1981 |
| JP | 2000-063985 A | 2/2000 |
| JP | 2006-037215 A | 2/2006 |
| JP | 2006-045580 A | 2/2006 |
| JP | 2008-255445 A | 10/2008 |
| KR | 10-2009-0043570 A | 5/2009 |
| KR | 10-2013-0123460 A | 11/2013 |
| KR | 10-1353643 B1 | 1/2014 |
| KR | 10-2014-0014248 A | 2/2014 |
| KR | 10-1853767 A | 5/2018 |
| KR | 10-2020-0073788 A | 6/2020 |
| KR | 10-2022-0087938 A | 6/2022 |

OTHER PUBLICATIONS

D. J. Blickwede, "Decarburization by Open-Coil Annealing," Journal of Metals, Aug. 1961.

Office Action and Search Report dated May 16, 2025 issued in corresponding Chinese Patent Application No. 202180085921.0. (Note: JP 2006045580 A. JP 2008255445 A, and CN 102747309 A already submitted.).

* cited by examiner

【Figure 1】
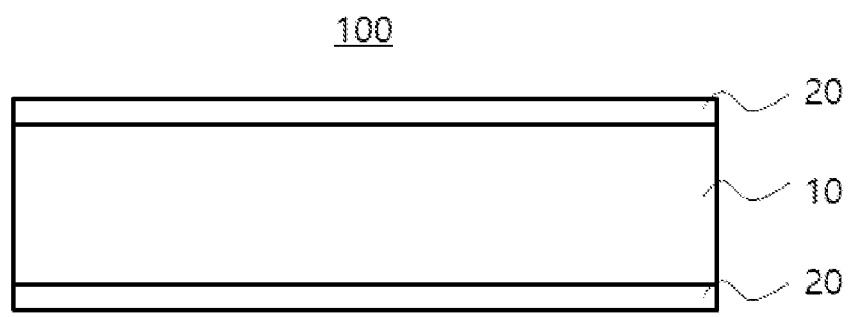

【Figure 2】
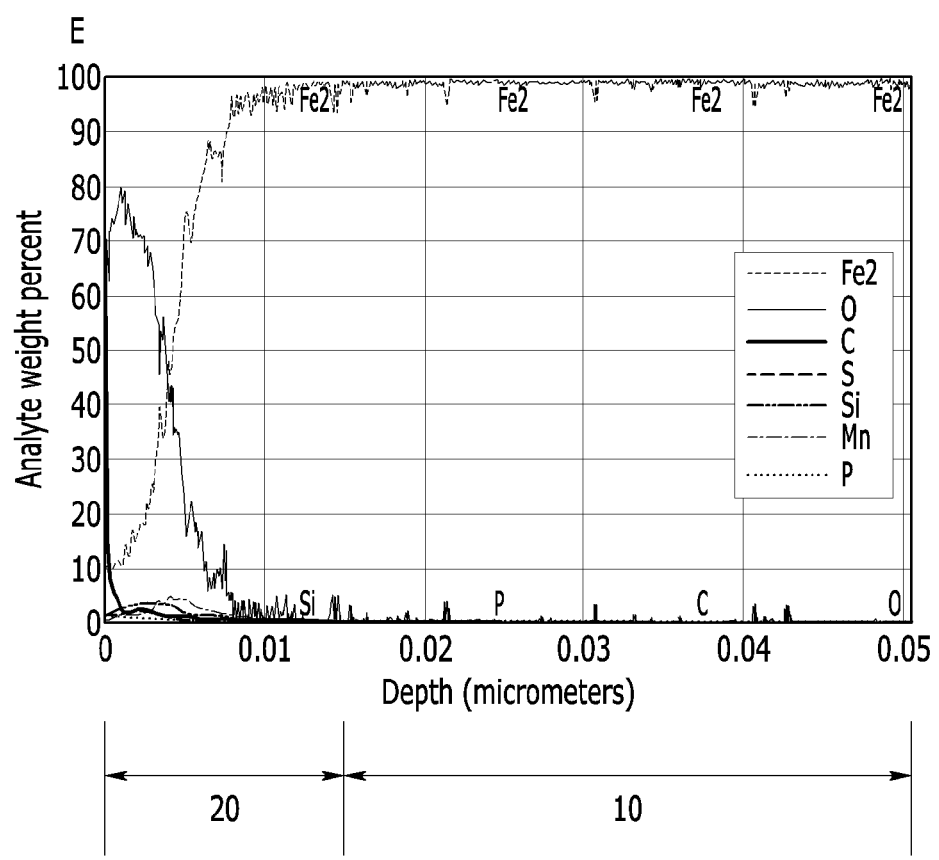

HIGH-STRENGTH COLD-ROLLED ENAMEL STEEL SHEET WITH EXCELLENT ADHESION, AND METHOD OF MANUFACTURING SAME

CROSS-REFERENCE OF RELATED APPLICATIONS

This application is the U.S. National Phase under 35 U.S.C. § 371 of International Patent Application No. PCT/KR2021/019098, filed on Dec. 15, 2021, which in turn claims the benefit of Korean Application No. 10-2020-0178477, filed on Dec. 18, 2020, the disclosures of which applications are incorporated by reference herein.

TECHNICAL FIELD

The present disclosure relates to a high-strength cold-rolled enamel steel sheet with excellent adhesion and a method of manufacturing the same. More specifically, the present disclosure relates to a continuous annealed high-strength cold-rolled enamel steel sheet that does not generate bubble defects after enameling and has excellent fishscale resistance and enamel adhesion, and a method of manufacturing the same.

BACKGROUND ART

Enamel steel sheet is a kind of surface-treated product having improved corrosion resistance, weather resistance, heat resistance, etc. By applying a vitric glaze on a base steel sheet, such as a hot-rolled steel sheet or cold-rolled steel sheet, and then firing the base steel sheet at high temperatures. These enamel products have been used as materials for building exteriors, home appliances, tableware, and various industrial uses by taking the advantage of the strengths of steel sheet and glass.

Rimmed steel has been used as an enamel steel sheet over the years, but as a continuous casting method has been actively used in terms of recent productivity improvement, most of the materials have been continuously cast.

One of the most fatal flaws of enamel steel sheet, a fishscale defect, is a representative enamel defect caused as hydrogen dissolved in the steel during a manufacturing process of the enamel product is supersaturated in the steel while being cooling after firing, and then released to a surface of the steel to cause an enamel layer to fall off in the form of fish scales.

When such a fishscale defect occurs, rust may intensively occurs in the defect area to significantly reduce the value of the enamel product, and thus, it is necessary to suppress the occurrence of the fishscale. In order to prevent fishscale defects, it is necessary to form a large amount of sites capable of holding hydrogen dissolved in steel inside the steel.

Accordingly, in order to prevent fishscale defects that deteriorate enamel properties and secure workability, open coil annealing (OCA), a type of batch annealing (BAF) method, is sometimes applied, but in this case, a heat treatment process takes several days, leading to problems in that productivity is lowered due to the heat treatment for a long period of time, manufacturing costs increase, and quality deviation in the coil is significant. In addition, in the open coil annealing method, it may be difficult to control the amount of decarburization, and if the amount of decarburization is too large so the amount of carbon in the steel is too small, the grain boundaries of the steel sheet may be softened, and cracks, such as brittle fracture, may occur during product formation.

In order to overcome the problems of productivity deterioration and the increase in manufacturing costs due to annealing for a long period of time, the recently developed enamel steel sheet actively utilizes a continuous annealing process. Enamel steel by the continuous annealing method usually uses precipitates, such as titanium (Ti), or inclusions by the non-deoxidation method as a hydrogen occlusion source based on ultra-low carbon steel.

Even in this case, however, as a large amount of carbonitride-forming elements are added, various problems arise, such as an increase in cost, a deterioration in passing ability, an increase in surface defect rate due to precipitates and non-deoxidized products.

As a large amount of titanium is added to the enamel steel sheet using titanium-based precipitates to suppress a hydrogen reaction that causes fishscale, nozzle clogging frequently occurs due to titanium nitride (TiN) and inclusions in the continuous casting stage of the steelmaking process, which are direct factors of workability deterioration and a production load. In addition, TiN mixed in molten steel exists in an upper portion of the steel sheet, causing blister defects, which are typical bubble defects, and titanium added in large amounts may form a titanium-based oxide layer, which is a factor hindering adhesion between the steel sheet and a glaze layer.

Meanwhile, in the case of high-oxygen enamel steel sheet, which is a representative method for improving fishscale resistance by increasing the dissolved oxygen content inside the steel sheet and utilizing inclusions, such as oxides in the steel, to occlude hydrogen, the content of oxygen remaining in the steel is basically maintained to be high due to the nature of the steel sheet. Accordingly, dissolution loss of refractories in a continuous casting process occurs severely due to oxides, which not only becomes a major factor in reducing steelmaking productivity, but also increases a surface defect rate due to oxidative inclusions.

In addition, since enamel steel is used as a material for structural members in most cases, strengthening of competitiveness is promoted through weight reduction of the members in used by increasing the strength of materials, and to this end, it is preferred to secure yield strength after high-temperature heat treatment for drying the glaze in the enamel process by 220 MPa or more.

RELATED ART DOCUMENT

[Patent document]
Korean Patent No. 10-1353643 (2014.01.14)

DISCLOSURE

Technical Problem

An aspect of the present disclosure is to provide a high-strength cold-rolled enamel steel sheet with excellent enamel adhesion and a method of manufacturing the same.

More specifically, the present disclosure relates to a continuously annealed cold-rolled enamel steel sheet having a yield strength of 220 MPa or more after vitreous enameling, no bubble defects, and excellent fishscale resistance and enamel adhesion, and a method of manufacturing the same.

The object of the present disclosure is not limited to the aforementioned object, and other objects not mentioned will be clearly understood by those skilled in the art from the following description.

Technical Solution

According to an aspect of the present disclosure, a high-strength cold-rolled enamel steel sheet comprising, in wt %, C: 0.01 to 0.1%, Mn: 0.05 to 0.4%, Si: 0.001 to 0.03%, Al: 0.03 to 0.12%, P: 0.02 to 0.04%, S: 0.001 to 0.02%, Cu: 0.03 to 0.08%, Mo: 0.13 to 0.30%, N: 0.004% or less, O: 0.003% or less, and the balance of Fe and inevitable impurities, wherein an oxide layer of the high-strength cold-rolled enamel steel sheet formed from a surface to the inside has a thickness of 0.006 to 0.030 μm and satisfies the following Equations (1) and (2):

$$0.95 \leq Cu/P \leq 2.95 \quad \text{Equation (1):}$$

$$0.20 \leq (Mo/96)/(C/12+N/14) \leq 0.90 \quad \text{Equation (2):}$$

(wherein Cu, P, Mo, C, and N refer to the content (wt %) of each element.).

In one aspect, in the high-strength cold-rolled enamel steel sheet, an oxide layer formed from the surface to the inside has a thickness of 0.006 to 0.030 μm.

In one aspect, the high-strength cold-rolled enamel steel sheet may satisfy the following Equation (3).

$$0.75 \leq Cv \leq 2.45 \quad \text{Equation (3):}$$

(wherein Cv is a difference in cementite volume fraction ($C\frac{1}{2}t - C\frac{1}{8}t$), and $C\frac{1}{2}t$ and $C\frac{1}{8}t$ refer to a cementite volume fraction (%) at a center portion and a cementite volume fraction (%) at a ⅛ portion of the steel sheet in a thickness direction, respectively.)

In one aspect, the high-strength cold-rolled enamel steel sheet may satisfy the following Equation (4).

$$0.07 \leq MVv \leq 0.14 \quad \text{Equation (4):}$$

(wherein MVv is a difference in micro-void volume fraction ($MV\frac{1}{8}t - MVAv$), $MV\frac{1}{8}t$ is a micro-void volume fraction (%) at ⅛ portion of the steel sheet in a thickness direction, and MVAv is an average micro-void volume fraction (%)).

In one aspect, the high-strength cold-rolled enamel steel sheet may have a yield strength of 220 MPa or more after enamel firing heat treatment.

In one aspect, the high-strength cold-rolled enamel steel sheet may have enamel adhesion of 95% or more.

In one aspect, the high-strength cold-rolled enamel steel sheet may have a hydrogen permeability ratio of 600 sec/mi or more.

According to another aspect of the present disclosure, a method of manufacturing a high-strength cold-rolled enamel steel sheet includes: hot rolling a slab comprising, in wt %, C: 0.01 to 0.1%, Mn: 0.05 to 0.4%, Si: 0.001 to 0.03%, Al: 0.03 to 0.12%, P: 0.02 to 0.04%, S: 0.001 to 0.02%, Cu: 0.03 to 0.08%, Mo: 0.13 to 0.30%, N: 0.004% or less, O: 0.003% or less, and the balance of Fe and inevitable impurities and satisfying the following Equations (1) and (2) to manufacture a hot-rolled steel sheet; cold-rolling the hot-rolled steel sheet to manufacture a cold-rolled steel sheet; and annealing the cold-rolled steel sheet, wherein $$0.95 \leq Cu/P \leq 2.95 \quad \text{Equation (1):}$$

$$0.20 \leq (Mo/96)/(C/12+N/14) \leq 0.90 \quad \text{Equation (2):}$$

(wherein Cu, P, Mo, C, and N refer to the content (wt %) of each element.)

In another aspect, the annealing step may be carried out for 20 to 180 seconds at a temperature of 720 to 850° C. and a humid atmosphere with an oxidation capacity index (PH2O/PH2) of 0.51 to 0.65.

Advantageous Effects

The high-strength cold-rolled enamel steel sheet according to the present disclosure satisfies the above alloy composition and content ranges and also satisfies Equations (1) and (2), thereby controlling the thickness of the oxide layer formed from the surface to the inside at an appropriate level, and thus providing the high-strength cold-rolled enamel steel sheet with excellent fishscale resistance and enamel adhesion.

In addition, the high-strength cold-rolled enamel steel sheet according to the present disclosure may have improved productivity and workability by utilizing low carbon steel in the range of C 0.01 to 0.1% with excellent surface characteristics in the steelmaking step, may have a significantly improved enamel characteristics through high-speed heat treatment operation by controlling the thickness of the oxide layer and the volume fraction of carbides in steel in the thickness direction by optimizing the atmosphere in the furnace when heat-treating in the continuous annealing furnace after cold rolling, and maintain a high level of strength after enamel firing heat treatment.

In addition, the high-strength cold-rolled enamel steel sheet according to the present disclosure promotes a decarburization reaction by controlling the atmosphere in the continuous annealing process using cementite, which is a low-temperature precipitate. Cementite exists while being uniformly dispersed during hot rolling, and micro-voids formed by cold rolling and decarburization reactions act as hydrogen occlusion sources to prevent fishscale defects caused by hydrogen.

Meanwhile, residual carbon in the surface layer of the steel sheet acts as a factor inducing bubble defects in an enamel product due to a gasification reaction during enamel firing, but in the present disclosure, the occurrence of surface bubble defects, as well as enameling properties, may be prevented by controlling the distribution of carbides and micro-voids in the thickness direction of the cold-rolled steel sheet.

BRIEF DESCRIPTION OF DRAWINGS

FIG. 1 is a schematic cross-sectional view of a high-strength cold-rolled enamel steel sheet according to an example of the present invention.

FIG. 2 is a result of analyzing components for each thickness direction of the cold-rolled steel sheet manufactured by Example 3 by glow discharge spectroscopy (GDS).

MODE FOR INVENTION

Hereinafter, a high-strength cold-rolled enamel steel sheet with excellent adhesion and a method of manufacturing the same according to the present disclosure will be described in detail. The drawings presented hereinafter are provided as examples to sufficiently transmit the technical concept of the present invention. Thus, the present invention is not limited to the drawings presented hereinafter and may be embodied in a different form, and the drawings present hereinafter may be exaggerated to be illustrated to clarify the technical concept of the present invention. Here, technical terms and scientific terms have the same meaning as generally understood by a person skilled in the art to which the present invention pertains, unless otherwise defined, and a detailed description for a related known function or configuration considered to unnecessarily divert the gist of the present invention will be omitted in the following descriptions and accompanying drawings.

Throughout the specification, unless explicitly described to the contrary, the word "comprise" and variations, such as "comprises" or "comprising", will be understood to imply the inclusion of stated elements but not the exclusion of any other elements.

An embodiment of the present disclosure relates to a high-strength cold-rolled enamel steel sheet comprising, in wt %, C: 0.01 to 0.1%, Mn: 0.05 to 0.4%, Si: 0.001 to 0.03%, Al: 0.03 to 0.12%, P: 0.02 to 0.04%, S: 0.001 to 0.02%, Cu: 0.03 to 0.08%, Mo: 0.13 to 0.30%, N: 0.004% or less, 0: 0.003% or less, and the balance of Fe and inevitable impurities and satisfying the following Equations (1) and (2):

$$0.95 \leq Cu/P \leq 2.95 \quad \text{Equation (1):}$$

$$0.20 \leq (Mo/96)/(C/12+N/14) \leq 0.90 \quad \text{Equation (2):}$$

(wherein Cu, P, Mo, C, and N refer to the content (wt %) of each element.).

As described above, the high-strength cold-rolled enamel steel sheeting according to the present disclosure satisfies the above alloy composition and content ranges and also satisfies Equations (1) and (2), thereby controlling the thickness of the oxide layer formed from the surface to the inside at an appropriate level, and thus providing the high-strength cold-rolled enamel steel sheet with excellent fishscale resistance and enamel adhesion.

In addition, the high-strength cold-rolled enamel steel sheet according to the present disclosure may improve productivity and workability by utilizing low carbon steel in the range of C 0.01 to 0.1% with excellent surface characteristics in a steelmaking step, may significantly improve enamel characteristics even through high-speed heat treatment operation by optimizing the atmosphere in a continuous annealing furnace and controlling a thickness of an oxide layer and a volume fraction of carbides in steel in a thickness direction when heat-treating in the furnace after cold rolling, and may maintain high level of strength after enamel firing heat treatment.

In addition, the high-strength cold-rolled enamel steel sheet according to the present disclosure promotes a decarburization reaction by controlling the atmosphere in a continuous annealing process using cementite, which is a low-temperature precipitate. Cementite exists while being uniformly dispersed during hot rolling, and micro-voids formed by cold rolling and a decarburization reaction act as hydrogen occlusion sources to prevent fishscale defects caused by hydrogen.

Meanwhile, residual carbon in the surface layer of the steel sheet acts as a factor inducing bubble defects in an enamel product due to a gasification reaction during enamel firing, but in the present disclosure, the occurrence of surface bubble defects, as well as enameling properties, may be prevented by controlling the distribution of carbides and micro-voids in the thickness direction of the cold-rolled steel sheet.

Hereinafter, the reason for limiting numerical value of an alloy component content in an example of the present disclosure will be described. Hereinafter, unless otherwise specified, units are wt %.

In the high-strength cold-rolled enamel steel sheet according to an embodiment of the present disclosure, the content of carbon (C) may be 0.01 to 0.1%, more preferably, 0.02 to 0.08%.

If too much C is added, exceeding 0.1%, the amount of carbon dissolved in the steel may increase to increase the strength, but the development of texture during annealing may be hindered, resulting in poor formability and causing bubble defects due to bubbling in an enamel layer. Meanwhile, if C is too small, less than 0.01, the fraction of carbides that act as sites for occluding hydrogen in the steel is low, resulting in a vulnerability to fishscale defects.

Regarding a manufacturing process to be described below, since decarburization is performed in a high oxidation capacity index atmosphere during a final annealing process, the C content in the slab and the C content in the final steel sheet may be different from each other. Since decarburization is about 0.01 to 0.05 wt %, the C content in the final steel sheet may be 0.01 to 0.05%. The C content in the final steel sheet may have a concentration gradient in the thickness direction, and the aforementioned C content represents an average of the C content in the entire steel sheet 100 including an oxide layer 20. More specifically, the C content in the final steel sheet may be 0.015 to 0.045%.

In the high-strength cold-rolled enamel steel sheet according to an example of the present disclosure, the content of manganese (Mn) may be 0.05 to 0.40%, more preferably, 0.07 to 0.38%.

Mn, as a representative solid solution strengthening element, precipitates sulfur, which is dissolved in steel, in the form of manganese sulfide (MnS) to prevent hot shortness and promotes the precipitation of carbides. If Mn is added too little, less than 0.05%, it may be difficult to obtain the aforementioned effect sufficiently. Meanwhile, if the content of Mn is too large, exceeding 0.40%, formability may be deteriorated and an Ar3 transformation temperature may be lowered, which may cause transformation during enamel firing to induce deformation.

In the high-strength cold-rolled enamel steel sheet according to an example of the present disclosure, the content of silicon (Si) may be 0.001 to 0.03%, more preferably, 0.002 to 0.027%.

Si is an element that promotes the formation of carbides that serve as hydrogen occlusion sources. If Si is added too little, less than 0.001%, it may be difficult to sufficiently obtain the aforementioned effect. On the other hand, if Si is added too much in excess of 0.03%, an oxide film is formed on the surface of the steel sheet, which may cause a problem of lowering enamel adhesion.

In the high-strength cold-rolled enamel steel sheet according to an example of the present disclosure, the content of aluminum (Al) may be 0.03 to 0.12%, more preferably, 0.035 to 0.115%.

Aluminum (Al) is used as a powerful deoxidizer to remove oxygen in molten steel during the steelmaking step, and is an element that improves aging by adhering dissolved nitrogen. If Al is added too little, less than 0.03%, it may be difficult to sufficiently obtain the above-described effect. On the other hand, if Al is added too much, exceeding 0.12%, aluminum oxide may remain in the steel or on the surface of the steel, thereby causing the problem of causing bubble defects such as blisters in the enamel treatment process.

In the high-strength cold-rolled enamel steel sheet according to an example of the present disclosure, the content of phosphorus (P) may be 0.02 to 0.04%, more preferably, 0.022 to 0.038%.

Phosphorus (P) is a typical material strengthening element. When P is added too little, less than 0.02%, it may be difficult to sufficiently obtain the above-described effect. On the other hand, if P is added too much in excess of 0.04%, it may not only deteriorate the formability by forming a segregation layer inside the steel sheet, but also deteriorate pickling property of the steel, which may adversely affect the enamel adhesion.

In the high-strength cold-rolled enamel steel sheet according to an example of the present disclosure, the content of sulfur (S) may be 0.001 to 0.020%, more preferably, 0.002% to 0.018%.

Sulfur (S) is an element that binds to manganese to cause red hot brittleness. If S is added too little, less than 0.001%, a problem of worsening weldability may occur. If S is added too much, exceeding 0.020%, ductility may be significantly reduced, which not only deteriorates workability, but also excessively precipitates manganese sulfide, which may adversely affect the fishscale properties of the product.

In the high-strength cold-rolled enamel steel sheet according to an example of the present disclosure, the content of copper (Cu) may be 0.03 to 0.08%, more preferably, 0.032 to 0.078%.

Copper (Cu) is an element added to enhance solid solution strengthening and enamel adhesion. In order to obtain such effects, Cu should be added in an amount of 0.03% or more, but if the content of Cu is high, appropriate roughness characteristics of a surface of the steel sheet cannot be obtained by lowering a pickling speed in an acid treatment step, which is a pre-enamel process, and thus, it is preferable to limit an upper limit to 0.08%.

In the high-strength cold-rolled enamel steel sheet according to an example of the present disclosure, the content of molybdenum (Mo) may be 0.13 to 0.30%, more preferably, 0.15 to 0.28%.

Mo is not only combined with carbon in the steel to form carbide or exists in a solid solution state to strengthens the material, but also the precipitates serve as an occlusion source of hydrogen in the steel to be effective in improving fishscale resistance. In order to exhibit such effects, Mo needs to be added in an amount of 0.13% or more, but if a large amount of Mo is added, a recrystallization temperature may increase to degrade annealing workability and act as a factor in cost increase due to the addition of ferroalloy, so an upper limit thereof is preferably limited to 0.30%.

In the high-strength cold-rolled enamel steel sheet according to an example of the present disclosure, the nitrogen (N) content may be 0.004% or less, and more specifically, 0.0005 to 0.0037%.

N is a typical hardening element, but if the added amount increases, aging defects may occur frequently, formability may deteriorate, and bubble defects may occur in an enamel treatment process. Therefore, it is preferable to limit an upper limit of N to 0.004%.

In the high-strength cold-rolled enamel steel sheet according to an example of the present disclosure, the content of oxygen (O) may be 0.003% or less, and more specifically, 0.0001 to 0.0019%.

O is an essential element in forming oxides, and such oxides act as a factor that not only causes a dissolution loss of refractories during the steelmaking step, but also causes surface defects due to oxides on the surface during steel sheet manufacturing. Therefore, it is preferably to limit the amount of O added in the slab to 0.003 wt % or less.

In relation to a manufacturing process to be described below, as an oxidation capacity index atmosphere is applied in the final annealing process, the decarburization reaction may be promoted, and some oxygen may penetrate to form the oxide layer 20 as shown in FIG. 1. However, since a thickness of the oxide layer is very thin compared to the entire steel sheet 100, the variation in the amount of oxygen in the entire steel sheet 100 is not large, but the oxide layer may contain 5% or more of oxygen. More specifically, the oxygen layer 20 may include 10 to 50% of oxygen. The oxygen content of the oxide layer 20 refers to an average content in the oxide layer 20.

In addition to the above components, the present disclosure includes the balance of Fe and inevitable impurities, and the addition of effective components other than the above components is not excluded. The inevitable impurities may include Ti, Nb, etc. In an embodiment of the present disclosure, Ti and Nb are not intentionally added, and the high-strength cold-rolled enamel steel sheet may optionally further include one or more of Ti: 0.005% or less and Nb: 0.003% or less.

Meanwhile, in the case of the inventive steel, elements, such as titanium (Ti), which have higher oxidizing properties than iron (Fe), are not added, and enamel adhesion between the steel sheet and the glaze may be significantly improved by controlling the surface oxide layer.

FIG. 1 is a schematic cross-sectional view of a cold-rolled enamel steel sheet for according to an example of the present disclosure. As shown in FIG. 1, the oxide layer 20 is formed from the surface of the cold-rolled steel sheet to the inside. The oxide layer 20 is distinguished from a steel sheet substrate 10 containing less than 5% of oxygen in that the oxide layer 20 contains 5% or more of oxygen. Specifically, when analyzing an oxygen concentration in the cross-section of the steel sheet from the surface to the inside, the oxide layer 20 and the substrate 10 are distinguished from each other based on a point containing 5% of oxygen. In the case of a plurality of points containing 5% of oxygen, the innermost point is identified as a starting point.

Enamel products are products in which an organic glaze is applied on a steel sheet, so it is very important to secure adhesion between the steel sheet and the glaze. In general, a main component of the glaze is formed of a silicon-oxide ($SiO_2$)-based material, and in many cases, expensive glazes containing a large amount of NiO among the glaze components are applied to prevent deterioration of adhesion with the steel sheet.

In an embodiment of the present disclosure, enamel adhesion of the high-strength cold-rolled enamel steel sheet may be improved by controlling the thickness of the oxide layer on the surface thereof. By managing the thickness of the oxide layer mainly including 90 wt % or more of iron oxide (FeO-based) within a certain range, covalent bonding with silicon (Si) atoms of a glaze layer is promoted, thereby improving enamel adhesion. To this end, it is necessary to manage the thickness of the oxide layer to 0.006 to 0.030 μm. If the thickness of the oxide layer is too thin, less than 0.006 μm, bonding force between the glaze layer and the steel sheet may decrease, making it difficult to secure enamel adhesion, and on the other hand, if the thickness of the oxide layer is too thick, exceeding 0.030 μm, it may be advantageous in terms of adhesion but deteriorates the surface characteristics of the steel sheet. Therefore, the thickness of the oxide layer 20 on the surface of the steel sheet is preferably 0.006 to 0.030 μm, more preferably, 0.007 to 0.028 μm. The thickness of the oxide layer 20 may be different throughout the steel sheet 100, and in an embodiment of the present disclosure, the thickness of the oxide layer 20 refers to an average thickness of the entire steel sheet 100.

To this end, it may be important to satisfy the following Equations (1) and (2), as well as alloy composition and content control. If either of the two Equations is not satisfied, the thickness of the oxide layer may not satisfy the range of 0.006 to 0.030 μm.

$$0.95 \leq Cu/P \leq 2.95 \quad \text{Equation (1):}$$

$$0.20 \leq (Mo/96)/(C/12+N/14) \leq 0.90 \quad \text{Equation (2):}$$

(In the above Equations (1) and (2), Cu, P, Mo, C, and N refer to the content (wt %) of each element.)

It is preferable to satisfy Equation (1) in order to secure the adhesion and surface characteristics of the enamel product. If the value of Equation (1) is too low, less than 0.95, the enamel adhesion may deteriorate. Meanwhile, if the value of Equation (1) increases above a certain level, gas inflow to the surface portion may increase, and thus, enamel surface defects, such as bubble defects, may frequently occur, which may act as a factor that lowers the reliability of the product. Therefore, in order to secure enamel adhesion and suppress surface bubble defects, it is preferable to limit the value of Equation (1) to 0.95 to 2.95, more preferably, to 0.98 to 2.90.

In addition, molybdenum in the steel reacts with carbon, nitrogen, etc. To form carbonitride, thereby improving workability and serving as a hydrogen occlusion source, so it is necessary to consider the reactivity with carbon and nitrogen in a complex manner, as well as each element, and in this case, it preferably satisfies Equation (2).

If the value of Equation (2) is too low, less than 0.20, the amount of dissolved element remaining in the steel may increase to cause deterioration of workability, whereas if the value of Equation (2) is too high, exceeding 0.90, rolling and annealing passing ability may deteriorate and manufacturing cost may increase. More preferably, the value of Equation (2) is 0.22 to 0.88.

Next, the reason for limiting the volume fraction of carbides in the steel sheet micro-voids and hot rolling step of the present disclosure will be described.

The carbide used in the inventive steel of the present disclosure is used as a hydrogen occlusion source that not only crushes the carbide itself in the cold rolling process due to a difference in ductility with the base material, or forms micro-voids by subsequent decarburization heat treatment, but also fixes hydrogen in the steel itself. Therefore, such a volume fraction of carbides affects the enamel properties not only by itself but also by the interrelationship with the additive element.

The high-strength cold-rolled enamel steel sheet with excellent adhesion proposed in the present disclosure actively utilizes not only carbides such as Fe3C (cementite) but also micro-voids due to decarburization as a location of hydrogen occlusion by controlling the steel composition, and the present disclosure provides a high-strength cold-rolled enamel steel sheet and products thereof with excellent enamel adhesion and fishscale resistance without surface defects by controlling components and processes that affect enamel adhesion and surface defects among steel components.

The cementite uniformly dispersed and precipitated during the hot rolling is crushed during the cold rolling, and also acts as a decarburization reaction source through atmosphere control during the annealing process to form micro-voids that are hydrogen occlusion sources, which may effectively fix hydrogen in the steel to suppress the fishscale defect. By controlling the carbide and micro-void fraction in the thickness direction by continuous annealing decarburization, and also controlling the oxide behavior of the steel sheet surface layer, it has a great effect in suppressing the enamel adhesion and bubble defects.

On the other hand, unlike the high-temperature precipitation/inclusion system that is precipitated in the high-temperature solidification process, in an embodiment of the present disclosure, carbides stable at low temperatures are mainly utilized, thereby preventing the deterioration in workability such as the dissolution loss of the refractories or the clogging of the casting nozzle and the surface defects such as blackline, which were the problem in the existing enamel steel. The carbide fraction has a close relationship with the total carbon content in the steel and is also significantly affected by the operating conditions.

As a specific example, the high-strength cold-rolled enamel steel sheet may satisfy Equation (3) below.

$$0.75 \leq Cv \leq 2.45 \quad \text{Equation (3):}$$

(wherein Cv is a difference in cementite volume fraction ($C\frac{1}{2}t - C\frac{1}{8}t$), and $C\frac{1}{2}t$ and $C\frac{1}{8}t$ refer to a cementite volume fraction (%) at a center portion and a cementite volume fraction (%) at a ⅛ portion of the steel sheet in a thickness direction, respectively.)

Carbon present in the metal alloy is combined with metal atoms to form carbides, and one of the carbides formed at a relatively low temperature by combining iron with carbon is cementite. Usually, in the carbon steel, the cementite is formed between 250 and 700° C., and is coarsened into spherical particles at a higher temperature than the above temperature. The cementite generated in the hot rolling process is crushed in the cold rolling process and decomposed in the decarburization process to act as a source for occluding hydrogen. However, when these cementites are intensively present on the surface of the steel, these cementites become a source that promotes the gasification reaction of carbon during the enamel firing, which becomes a factor inducing the bubble defects. Therefore, it is necessary to strictly control the carbide volume fraction in the thickness direction in order to suppress the fishscale and bubble defects of the enamel products. That is, if the difference Cv in cementite volume fraction in the thickness direction of the cold-rolled steel sheet is too small, less than 0.75, the carbide fraction in the surface layer may increase as the decarburization reaction does not proceed smoothly, which may act as a factor inducing the bubble defects after the enamel firing. On the other hand, if Cv is too large, exceeding 2.45, there may be a problem in that it is difficult to suppress the occurrence of the fishscale defect because the supply of sites capable of occluding hydrogen in the steel is insufficient. Therefore, the difference Cv in cementite fraction in the thickness direction may be 0.75 to 2.45%, more preferably, 0.78 to 2.43%.

In addition, the high-strength cold-rolled enamel steel sheet may satisfy Equation (4) below.

$$0.07 \leq MVv \leq 0.14 \quad \text{Equation (4):}$$

(wherein MVv is a difference in micro-void volume fraction ($MV\frac{1}{8}t - MVAv$), $MV\frac{1}{8}t$ is a micro-void volume fraction (%) at ⅛ portion of the steel sheet in a thickness direction, and MVAv is an average micro-void volume fraction (%)).

The cementite precipitated during the hot rolling is crushed during the cold rolling and the decarburization heat treatment to form micro-voids around them. The formed micro-voids act as the occlusion source of hydrogen to suppress the occurrence of the fishscale defect. For the micro-void in the cold-rolled steel in cold-rolled steel sheet, after taking 10 photos with a magnification of 1000 times the surface parallel to the rolling surface (ND surface) using a scanning electron microscope (SEM), the volume fraction of the micro-voids occupied by these areas was measured using an image analyzer. In an embodiment of the present disclosure, it was confirmed that there is a region in which the fishscale and bubble defects were simultaneously suppressed by controlling the distribution of the volume fraction of these micro-voids for each portion. In order to secure such an effect, it is necessary to manage the difference MVv in volume fraction of the micro-voids to 0.07 to 0.14%. If MVv is too small, less than 0.07, it may be advantageous in terms of the fishscale resistance, but the problems with the deterioration in the workability and the surface defects such as the bubble defects may occur frequently. On the other hand, if MVv is too large, exceeding 0.14, there are few sites that act as the hydrogen occlusion source that may fix hydrogen in the steel, so there may be a problem in that the fishscale defect rate of the product may increase. Therefore, the difference MVv in micro-void area fraction may be 0.07 to 0.14%, and more preferably, 0.073 to 0.137%.

As described above, the high-strength cold-rolled enamel steel sheet according to the present disclosure may have excellent strength characteristics and excellent enamel adhesion.

In detail, the high-strength cold-rolled enamel steel sheet according to an example of the present disclosure may have a yield strength of 220 MPa or more after enamel firing heat treatment.

The yield strength of a material used for a structural member is a physical property that influences dent resistance and shape freezing of a member, and is usually measured and analyzed by a tensile test method. In the case of enamel products, the yield strength at a processing inlet side produced and supplied by steelmakers is also important, but due to the nature of the product, enamel products undergo a heat treatment at high temperatures for a relatively long period of time for drying after the enamel glaze treatment. At this time, the heat treatment may vary depending on the type of glaze in use, but in the method of the present disclosure, the heat treatment was performed at 830° C. for 15 minutes, and then evaluation was performed. As such, in the characteristics of enamel products, the yield strength after heat treatment in the enamel treatment process acts as a major factor in examining the stability of the product. Meanwhile, since the yield strength measured by the tensile test method is a property that may change slightly depending on the test method during the tensile test, in this evaluation, a crosshead speed representing the tensile test speed per unit time was applied at 10 mm/min. And the yield strength after enamel firing heat treatment obtained therethrough may be 220 MPa or more, and more preferably, 225 MPa or more. At this time, an upper limit of the yield strength is not particularly limited, but may be, for example, 350 MPa.

In addition, the high-strength cold-rolled enamel steel sheet according to an embodiment of the present disclosure may have enamel adhesion of 95% or more. By satisfying these physical properties, the high-strength cold-rolled enamel steel sheet according to an embodiment of the present disclosure may be applied as a material for enamel even when using a relatively inexpensive glaze.

If the enamel adhesion is too low, since the glaze layer is dropped out during the distribution or handling after the enamel treatment and the marketability as the enamel material is lowered, in an enamel yarn, expensive glaze with a large amount of NiO is applied in consideration of stability, which acts as a factor of increasing the cost. Therefore, efforts are being made to propose a method of securing enamel adhesion even with low-cost glaze. In general, when the enamel adhesion is 90% or more, it is classified as the best enamel product, but in the method of the present disclosure, a method for securing enamel adhesion of 95% or more is proposed. In addition, if the enamel adhesion is lowered, the fishscale occurrence rate by hydrogen in the steel may also increase, so it is preferable to secure as high adhesion as possible. In the present disclosure, the excellent adhesion to enamel of 95% or more was secured in terms of the adhesion and the fishscale control. More specifically, the enamel adhesion may be 96% or more. The enamel adhesion refers to a numerical value expressed by indexing the drop out degree of the enamel glaze layer by evaluating the degree of energization at this site after a certain load is applied to the enamel layer with a steel ball as defined in the American Society for Testing and Materials standard, ASTM C313-78. At this time, an upper limit of the enamel adhesion is not particularly limited, but may be, for example, 100%.

Furthermore, a hydrogen permeability ratio of the high-strength cold-rolled enamel steel sheet according to an example of the present disclosure may be 600 sec/mm2 or more.

The hydrogen permeability ratio is a representative index for evaluating fishscale resistance indicating resistance to the fishscale defect which is a fatal defect when applying the enamel steel manufactured using the cold-rolled steel sheet according to an embodiment of the present disclosure, and evaluates the ability to fix hydrogen in the steel sheet by the method listed in European standard (EN10209). A value expressed by generating hydrogen from one direction of the steel sheet and measuring a time (ts, unit: seconds) for hydrogen to permeate into the opposite side of the steel sheet and dividing this by a square of the material thickness (t, unit: mm) is expressed as ts/t2 (unit: second/mm2). When the hydrogen permeation ratio is too low, in a case in which in the case where resistance to the fishscale defect is evaluated by the accelerated heat treatment at 200° C. for 24 hours after the enamel treatment, since there is a problem of using it as a stable enamel product because the defect rate is over 50%, in order to secure the steel sheet with the excellent fishscale resistance, it is necessary to manage the hydrogen permeation ratio at 600 sec/mm2 or more, and may be more preferably 610 sec/mm2 or more. At this time, an upper limit of the hydrogen permeation ratio is not particularly limited, but may be, for example, 2500 sec/mm2.

Next, a method for manufacturing the high-strength cold-rolled enamel steel sheet described above will be described.

Specifically, a method of manufacturing a high-strength cold-rolled enamel steel sheet includes: hot rolling a slab comprising, in wt %, C: 0.01 to 0.1%, Mn: 0.05 to 0.4%, Si: 0.001 to 0.03%, Al: 0.03 to 0.12%, P: 0.02 to 0.04%, S: 0.001 to 0.02%, Cu: 0.03 to 0.08%, Mo: 0.13 to 0.30%, N: 0.004% or less, 0: 0.003% or less, and the balance of Fe and inevitable impurities and satisfying the following Equations (1) and (2) to manufacture a hot-rolled steel sheet; cold-rolling the hot-rolled steel sheet to manufacture a cold-rolled steel sheet; and annealing the cold-rolled steel sheet.

$$0.95 \leq Cu/P \leq 2.95 \quad \text{Equation (1):}$$

$$0.20 \leq (Mo/96)/(C/12+N/14) \leq 0.90 \quad \text{Equation (2):}$$

(wherein Cu, P, Mo, C, and N refer to the content (wt %) of each element.)

First, the slab satisfying the aforementioned composition and Equations (1) and (2) is prepared. The molten steel whose composition is adjusted to the above-described composition in the steelmaking process may be manufactured into a slab through continuous casting. As described above, in the process of annealing the cold-rolled steel sheet, the contents of C and 0 are partially changed, and other alloy components are substantially the same as the above-described enamel steel sheet. Since the alloy components and the reason for limiting Equation (1) and Equation (2) have been described above, overlapping descriptions thereof will be omitted.

Thereafter, the manufactured slab is heated. By heating, the subsequent hot rolling process may be smoothly performed, and the slab may be homogenized. More specifically, the heating may mean reheating.

In this case, the slab heating temperature may be 1150 to 1280 r, specifically, 1180 to 1260° C. When the slab heating temperature is too low, the rolling load may increase rapidly in the subsequent hot rolling process, which may lower workability. On the other hand, when the slab heating temperature is too high, not only the energy cost increases, but also the amount of surface scale increases, which may lead to material loss.

Thereafter, the heated slab is hot-rolled to manufacture the hot-rolled steel sheet.

In an example of the present disclosure, the finishing hot rolling temperature of the hot rolling may be 850 to 910° C. When the finishing hot rolling temperature is too low, as the rolling is finished in the low temperature region, grain mixing proceeds rapidly, which may lead to the deterioration in rollability and workability. On the other hand, when the finishing hot rolling temperature is too high, the peelability of the surface scale is deteriorated, and the impact toughness due to grain growth may be lowered as the uniform hot rolling is not performed throughout the thickness. More specifically, the finishing hot rolling temperature may be 860 to 900° C.

Thereafter, the hot-rolled steel sheet manufactured after the hot rolling is finished is subjected to a winding process. More specifically, it may be a hot-rolled winding process.

In an example of the present disclosure, the winding temperature may be 580 to 720° C. The hot-rolled steel sheet may be cooled in a run-out-table (ROT) before winding. When the hot rolling winding temperature is too low, the temperature non-uniformity in the width direction occurs in the cooling and maintaining process, which not only causes material deviation as the formation of low-temperature precipitates is changed, but also adversely affects the enamel properties. On the other hand, when the winding temperature is too high, as the agglomeration of the carbide progresses, there is problem in that the corrosion resistance is lowered, the P grain boundary segregation is promoted to lower the cold rollability, and the workability is lowered due to coarsening of the structure in the final product. More specifically, the winding temperature may be 590 to 710° C.

The wound hot-rolled steel sheet may further include a step of pickling the steel sheet before the cold rolling.

Thereafter, the wound hot-rolled steel sheet is manufactured into the cold-rolled steel sheet through the cold rolling.

In an example of the present disclosure, the cold reduction ratio may be 60 to 90%. When the cold reduction ratio is too low, as the recrystallization driving force in the subsequent heat treatment process is not secured, non-recrystallized grains remain locally, which increases the strength, but significantly reduces the workability. In addition, as the crushing ability of the carbide formed in the hot-rolling process is lowered, the number of sites that may occlude hydrogen is reduced, making it difficult to secure the fishscale resistance, and considering the thickness of the final product, the thickness of the hot-rolled plate is lowered, so there is a problem that the rolling workability is also lowered. On the other hand, when the cold reduction ratio is too high, the material is hardened and the workability is deteriorated, as well as the load of the rolling mill increases, which deteriorates the workability. More specifically, the cold reduction ratio may be 63 to 88%.

Thereafter, the cold-rolled steel sheet may be annealed to manufacture an enamel steel sheet, and in this case, the annealing may refer to continuous annealing heat treatment. The cold-rolled material has high strength due to high deformation applied in the cold rolling, but has extremely poor workability, so the workability and decarburization reaction are secured by performing atmospheric heat treatment in the subsequent process.

In an embodiment of the present disclosure, the oxidation capacity (PH2O/PH2) condition is controlled so that the diffusion rate of carbon atoms is optimal to promote external diffusion of carbon atoms in the material, thereby improving decarburization properties. For this purpose, as a standard for optimization management of the decarburization annealing process, the decarburization temperature is in the range of 720 to 850° C., and the oxidation capacity (PH2O/PH2) was heat-treated in a wet atmosphere of 0.51 to 0.65. In this case, the appropriate holding time is 20 to 180 seconds.

More specifically, the heat treatment temperature may be 720 to 850° C. If the decarburization annealing temperature is too low, less than 720° C., the deformation formed by the cold rolling is not sufficiently removed, and thus, the workability may be significantly reduced and the decarburization rate by the atmospheric heat treatment may be too low, so the desired characteristics of the cold-rolled enamel steel sheet may not be secured. On the other hand, if the heat treatment temperature is too high, exceeding 850° C., not only the annealing passing ability due to plate breakage due to softening caused by the deterioration in the high temperature strength is lowered, but also the decarburization reaction is suppressed by increasing the thickness of the surface oxide layer, so the heat treatment temperature may be limited to 720 to 850° C. More preferably, the annealing temperature may be 730 to 840° C.

Further, in an example of the present disclosure, the oxidation capacity (PH2O/PH2) of the heat treatment atmosphere condition may be 0.51 to 0.65. If the oxidation capacity is too low, it takes a long time for decarburization, and thus, the decarburization is lowered during the continuous annealing, so it may be difficult to secure the enamel properties. On the other hand, if the oxidation capacity is too high, there is a problem in that the occurrence rate of the surface defects due to the surface film layer formed by peroxidation may be high. Therefore, the oxidation capacity of the atmospheric gas was limited to 0.51 to 0.65. More specifically, the oxidation capacity may be 0.52 to 0.64.

In addition, the holding time in the atmospheric continuous annealing process may be 20 to 180 seconds. Even when the cracking time at the holding temperature is too short, unrecrystallized grains remain, which significantly deteriorates the formability, and the decarburization reaction in the thickness direction does not work smoothly, which acts as a factor that lowers the enamel property, whereas if the holding time is too long, abnormal grain growth occurs due to the decarburization reaction, and thus, there is a problem of deterioration in workability due to material non-uniformity and deterioration in fishscale properties. Accordingly, the holding time at the cracking temperature may be 20 to 180 seconds. More preferably, the holding time may be 25 seconds to 160 seconds.

In addition, the process of temper rolling the heat-treated steel sheet after annealing the cold-rolled steel sheet may be further included. Through the temper rolling, the shape of the material may be controlled and the desired surface roughness may be obtained, but when the temper reduction ratio is too high, since there is a problem in that the material is hardened by work hardening and the workability is lowered, the reduction ratio of the temper rolling may be 3% or less. Specifically, the reduction ratio of the temper rolling may be 0.3 to 2.5%.

Furthermore, after the temper rolling of the cold-rolled steel sheet, a step of firing at a high temperature to dry the enameled glaze may be further included. By applying an enamel layer on the surface of the steel sheet by heating to a high temperature and cooling through the firing process, various characteristics suitable for the purpose, such as chemical resistance and heat resistance of the enamel product may be obtained. Meanwhile, if the firing temperature is too low, there is a problem of not being able to secure the adhesion of the enamel layer. On the other hand, if the firing temperature is too high, it acts as a cost increase factor due to an increase in energy sources in use, so the firing temperature may be applied at 780 to 850° C. More preferably, the firing temperature may be 790 to 840° C.

Hereinafter, the high-strength cold-rolled enamel steel sheet and the method of manufacturing the same according to the present disclosure will be described in more detail through examples. However, the following examples are only one reference for describing the present disclosure in detail, but the present disclosure is not limited thereto and may be implemented in various forms. Also, unless defined otherwise, all technical and scientific terms have the same meaning as commonly understood by one of ordinary skilled in the art to which the present disclosure pertains. The terminology used in the description herein is merely to effectively describe specific embodiments and is not intended to limit the present disclosure. In addition, the % unit of additives not specifically described in the specification is wt %, and 1 ppm is 0.0001 wt %.

Invention Examples 1 to 9, and Comparative Examples 1 to 9

A slab was prepared through a converter-second refining-casting process with, by wt %, the composition of Table 1 below and an alloy component including the balance iron (Fe) and inevitable impurities. This slab was maintained in a heating furnace at 1200° C. for 2 hours, and then subjected to hot rolling. In this case, a thickness of the hot-rolled steel sheet was 4.0 mm. The hot-rolled specimen was subjected to cold rolling with each reduction ratio after removing an oxide film on a surface through pickling treatment. The specimens subjected to the cold rolling were processed into enamel-treated specimens to inspect enamel properties and specimens for mechanical property analysis, and were subjected to heat treatment. Finishing hot rolling temperature (FDT), coiling temperature (CT), cold rolling reduction, annealing temperature (AT), holding time, oxidation capacity, and enamel firing temperature are summed up in [Table 2].

[Table 3] below shows operability, enamel property, materials, tissue properties, and the like of materials obtained through the above process for each manufacturing condition.

In the case of passing ability, "O" indicates operability of 90% or more compared to productivity of normal materials in the casting, hot rolling, and cold rolling processes, and "X" indicates that productivity is less than 90% or the defect occurrence rate is 10% or more.

The volume fraction (%) of carbide was obtained as a volume fraction of carbide with respect to the entire field of view using an image analyzer after obtaining images of 20 fields of view at 500× magnification using an optical microscope.

Yield strength (MPa) is the result of conducting a tensile test at a crosshead speed of 10 mm/min after preparing a tensile test piece after firing heat treatment for 15 minutes at each temperature in a firing furnace to simulate a drying process of the enamel glaze for the steel sheet.

The specimen of enamel treatment was cut to an appropriate size for each application to meet the purpose of the test. After the specimen for enamel treatment that is heat treated was completely degreased, the specimen was applied with a standard glaze (check frit) which is relatively vulnerable to the fishscale defects, and maintained at 300° C. for 10 minutes to remove moisture. The dried specimen was fired at a relatively low 800° C. for 15 minutes in order to highlight the differences in enamel properties such as adhesion, and then cooled to room temperature. In this case, an atmospheric condition of a furnace was a dew point temperature of 20° C., which is a harsh condition where fishscale defects are easy to occur.

After the specimen is subjected to the enamel treatment, a fishscale acceleration test was performed in which the specimen was maintained in an oven at 200° C. For 24 hours. After the fishscale acceleration treatment, the presence or absence of the fishscale defect was visually observed, and the case in which the fishscale defect does not occur was denoted by "O" and the case in which fishscale defect occurs was denoted by "X".

The enamel adhesion, which evaluated the adhesion between the steel sheet and the glaze was indicated by indexing the drop out degree of the enamel glaze layer by evaluating the degree of energization at this site after a certain load is applied to the enamel layer with a steel ball as defined in the American Society for Testing and Materials standard, ASTM C313-78. In the present disclosure, the enamel adhesion evaluation results were set to secure more than 95% of adhesion in terms of securing application stability in relatively inexpensive glazes.

The enamel surface was visually observed on the specimens maintained in an oven at 200° C. for 24 hours after the enamel treatment, and thus, the bubble defects were determined to be in three stages: "O" excellent, "Δ" normal, and "X" bad, respectively.

The hydrogen permeation ratio is one of the indices for evaluating the resistance to the fishscale, which is a fatal defect of the enamel, and is represented by ts/t2 (unit, sec/mm2) which is a value obtained by measuring a time (ts, unit second) that hydrogen is generated in one direction of a steel sheet and the hydrogen permeates into an opposite side by an experimental method indicated in the European standard (EN10209-2013), and dividing the time by a square of a material thickness (t, unit mm).

TABLE 1

| Classification | C | Mn | Si | Al | P | S | N | Cu | O | Mo | Equation (1) | Equation (2) |
|---|---|---|---|---|---|---|---|---|---|---|---|---|
| Inventive steel 1 | 0.029 | 0.26 | 0.009 | 0.065 | 0.025 | 0.008 | 0.0021 | 0.034 | 0.0022 | 0.169 | 1.36 | 0.686 |
| Inventive steel 2 | 0.041 | 0.14 | 0.007 | 0.074 | 0.036 | 0.015 | 0.0018 | 0.057 | 0.0011 | 0.273 | 1.58 | 0.802 |
| Inventive steel 3 | 0.053 | 0.36 | 0.012 | 0.087 | 0.031 | 0.012 | 0.0032 | 0.064 | 0.0008 | 0.214 | 2.06 | 0.480 |
| Inventive steel 4 | 0.068 | 0.28 | 0.020 | 0.096 | 0.028 | 0.016 | 0.0028 | 0.074 | 0.0015 | 0.158 | 2.64 | 0.281 |
| Inventive steel 5 | 0.074 | 0.11 | 0.024 | 0.071 | 0.037 | 0.009 | 0.0025 | 0.046 | 0.0017 | 0.254 | 1.24 | 0.417 |
| Comparative steel 1 | 0.003 | 0.24 | 0.011 | 0.042 | 0.009 | 0.011 | 0.0024 | 0.032 | 0.0016 | 0.193 | 3.56 | 4.770 |
| Comparative steel 2 | 0.018 | 0.33 | 0.015 | 0.038 | 0.026 | 0.054 | 0.0015 | 0.059 | 0.0011 | 0.238 | 2.27 | 1.543 |
| Comparative steel 3 | 0.036 | 0.26 | 0.022 | 0.005 | 0.078 | 0.014 | 0.0032 | 0.042 | 0.0284 | — | 0.54 | 0.000 |
| Comparative steel 4 | 0.046 | 0.81 | 0.245 | 0.058 | 0.028 | 0.011 | 0.0099 | — | 0.0015 | 0.038 | 0.00 | 0.087 |
| Comparative steel 5 | 0.098 | 0.34 | 0.015 | 0.137 | 0.031 | 0.024 | 0.0024 | 0.314 | 0.0021 | 0.942 | 10.13 | 1.177 |

TABLE 2

| Classification | Steel type No. | Finishing hot rolling temperature (° C.) | Coiling temperature (° C.) | Cold rolling reduction ratio (%) | Annealing temperature (° C.) | Holding time (sec) | Oxidation capacity ($P_{H2O}/P_{H2}$) | Enamel firing temperature (° C.) | Thickness of oxide layer (μm) | Carbon amount after annealing (%) |
|---|---|---|---|---|---|---|---|---|---|---|
| Inventive Example 1 | Inventive steel 1 | 880 | 640 | 75 | 740 | 150 | 0.55 | 820 | 0.024 | 0.016 |
| Inventive Example 2 | Inventive steel 1 | 880 | 640 | 80 | 780 | 120 | 0.55 | 820 | 0.019 | 0.017 |
| Inventive Example 3 | Inventive steel 1 | 880 | 640 | 85 | 820 | 90 | 0.55 | 820 | 0.017 | 0.016 |
| Inventive Example 4 | Inventive steel 2 | 890 | 680 | 65 | 760 | 80 | 0.53 | 800 | 0.009 | 0.021 |
| Inventive Example 5 | Inventive steel 2 | 890 | 680 | 80 | 830 | 40 | 0.53 | 800 | 0.022 | 0.024 |
| Inventive Example 6 | Inventive steel 3 | 870 | 600 | 75 | 780 | 120 | 0.60 | 830 | 0.026 | 0.027 |
| Inventive Example 7 | Inventive steel 4 | 890 | 640 | 75 | 820 | 30 | 0.59 | 830 | 0.024 | 0.034 |
| Inventive Example 8 | Inventive steel 5 | 890 | 680 | 80 | 800 | 120 | 0.55 | 830 | 0.020 | 0.037 |
| Inventive Example 9 | Inventive steel 5 | 890 | 680 | 80 | 830 | 60 | 0.55 | 830 | 0.015 | 0.041 |
| Comparative Example 1 | Inventive steel 1 | 720 | 640 | 80 | 600 | 120 | 0.55 | 820 | 0.002 | 0.025 |
| Comparative Example 2 | Inventive steel 2 | 890 | 740 | 45 | 820 | 15 | 0.53 | 750 | 0.004 | 0.038 |
| Comparative Example 3 | Inventive steel 3 | 870 | 480 | 75 | 890 | 90 | 0.70 | 830 | 0.036 | 0.021 |
| Comparative Example 4 | Inventive steel 4 | 890 | 640 | 93 | 820 | 200 | 0.26 | 880 | 0.003 | 0.045 |
| Comparative Example 5 | Comparative steel 1 | 910 | 640 | 75 | 820 | 100 | 0.53 | 820 | 0.001 | 0.002 |
| Comparative Example 6 | Comparative steel 2 | 880 | 680 | 75 | 820 | 90 | 0.53 | 820 | 0.003 | 0.009 |
| Comparative Example 7 | Comparative steel 3 | 880 | 680 | 75 | 820 | 90 | 0.55 | 820 | 0.002 | 0.028 |
| Comparative Example 8 | Comparative steel 4 | 880 | 680 | 75 | 820 | 90 | 0.55 | 820 | 0.001 | 0.037 |
| Comparative Example 9 | Comparative steel 5 | 880 | 680 | 75 | 820 | 90 | 0.55 | 820 | 0.003 | 0.069 |

TABLE 3

| classification | passing ability | Equation (3) $C_v$ (%) | Equation (4) $MV_v$ (%) | Yield strength (MPa) | Bubble defect occurrence | Fishscale occurrence | Enamel adhesion (%) | Hydrogen permeation ratio (sec/mm²) |
|---|---|---|---|---|---|---|---|---|
| Inventive Example 1 | ○ | 1.44 | 0.096 | 243 | ○ | ○ | 100.0 | 846 |
| Inventive Example 2 | ○ | 1.57 | 0.094 | 236 | ○ | ○ | 98.4 | 802 |
| Inventive Example 3 | ○ | 1.46 | 0.081 | 234 | ○ | ○ | 99.5 | 911 |
| Inventive Example 4 | ○ | 0.97 | 0.109 | 257 | ○ | ○ | 99.1 | 695 |
| Inventive Example 5 | ○ | 0.86 | 0.089 | 284 | ○ | ○ | 100.0 | 815 |
| Inventive Example 6 | ○ | 2.18 | 0.122 | 276 | ○ | ○ | 100.0 | 982 |
| Inventive Example 7 | ○ | 2.04 | 0.114 | 281 | ○ | ○ | 100.0 | 1025 |
| Inventive Example 8 | ○ | 2.09 | 0.104 | 268 | ○ | ○ | 99.7 | 768 |
| Inventive Example 9 | ○ | 2.23 | 0.129 | 294 | ○ | ○ | 99.2 | 926 |
| Comparative Example 1 | X | 0.54 | 0.041 | 214 | X | X | 81.7 | 491 |
| Comparative Example 2 | X | 0.40 | 0.052 | 206 | X | X | 74.2 | 528 |
| Comparative Example 3 | X | 2.69 | 0.182 | 197 | Δ | X | 91.4 | 572 |
| Comparative Example 4 | X | 2.54 | 0.033 | 251 | X | X | 84.3 | 396 |
| Comparative Example 5 | ○ | 0.01 | 0.001 | 136 | Δ | X | 84.1 | 258 |
| Comparative Example 6 | ○ | 0.27 | 0.044 | 159 | X | X | 90.6 | 411 |
| Comparative Example 7 | X | 0.51 | 0.036 | 192 | X | X | 73.2 | 462 |
| Comparative Example 8 | X | 0.58 | 0.048 | 211 | X | X | 70.6 | 374 |
| Comparative Example 9 | X | 3.32 | 0.064 | 285 | X | X | 67.3 | 427 |

As can be seen from [Table 1] to [Table 3], Inventive Examples 1 to 9 satisfying all of the component composition, manufacturing conditions, and oxide layer thickness of the present invention not only had good passing ability, but also satisfied the limited range of the present invention in terms of carbide and micro-void fractions and related indices, and did not have enamel defects such as fishscale and bubble defects even under severe treatment conditions, and the hydrogen permeation ratio was 600 sec/mm2 or more, the enamel adhesion index was 95% or more, and the yield strength of 220 MPa or more after enamel firing heat treatment were satisfied, and the properties targeted by the present disclosure were secured.

Meanwhile, most of Comparative Examples 5 to 9, which do not satisfy the chemical composition suggested in the present disclosure, did not only satisfy the thickness of the surface oxide layer, cementite and micro-void volume fraction in each thickness direction, hydrogen permeability ratio, enamel adhesion, etc. Presented in the present disclosure, but also have a problem of applicability due to fishscales or bubble defects occurred even in visual observation after enamel treatment.

In addition, although the chemical composition presented in the present disclosure was satisfied, when the finishing hot rolling temperature during hot rolling (Comparative Example 1), the hot-rolled coiling temperature (Comparative Examples 2 and 3), the cold rolling reduction ratio during cold rolling (Comparative Examples 2 and 4), annealing temperature in the annealing process (Comparative Examples 1 and 3), holding time (Comparative Examples 2 and 4), oxidation ability (Comparative Examples 3 and 4), and baking temperature in the enamel firing process (Comparative Examples 2 and 4) did not satisfy the range presented in the present disclosure, the thickness of the surface oxide layer was outside the range presented in the present disclosure, and in this case, it was confirmed that the enamel adhesion was less than 95%, or enamel defects, such as bubble defects or fishscale, occurred after enamel treatment and passing ability was not good, and in some cases, the yield strength after enamel firing heat treatment was less than 220 MPa, etc., and the target characteristics as a whole were not secured.

Meanwhile, FIG. 2 illustrates the result of analyzing the component distribution of the cold-rolled enamel steel sheet in the thickness direction according to Inventive Example 3 by GDS. It was confirmed that the innermost point where the oxygen content was 5 wt % was 0.016 μm, and the oxide layer 20 having a thickness of 0.016 μm was present on the surface.

Although the present disclosure has been described in terms of specific items such as detailed elements as well as the limited embodiments and the drawings, they are only provided to help more general understanding of the invention, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the present disclosure.

DESCRIPTION OF REFERENCE NUMERAL

100: cold-rolled enamel steel sheet
10: steel sheet substrate
20: oxide layer

The invention claimed is:

1. A high-strength cold-rolled enamel steel sheet comprising, in wt %, C: 0.01 to 0.1%, Mn: 0.05 to 0.4%, Si: 0.001 to 0.03%, Al: 0.03 to 0.12%, P: 0.02 to 0.04%, S: 0.001 to 0.02%, Cu: 0.03 to 0.08%, Mo: 0.13 to 0.30%, N: 0.004% or less, 0: 0.003% or less, and the balance of Fe and inevitable impurities, wherein an oxide layer of the high-strength cold-rolled enamel steel sheet formed from a surface to the inside has a thickness of 0.006 to 0.030 μm and satisfies the following Equations (1) and (2).

$$0.95 \leq Cu/P \leq 2.95 \qquad \text{Equation (1):}$$

$$0.20 \leq (Mo/96)/(C/12+N/14) \leq 0.90 \qquad \text{Equation (2):}$$

(wherein Cu, P, Mo, C, and N refer to the content (wt %) of each element).

2. The high-strength cold-rolled enamel steel sheet of claim 1, wherein
the high-strength cold-rolled enamel steel sheet satisfies the following Equation (3).

$$0.75 \leq Cv \leq 2.45 \qquad \text{Equation (3):}$$

(wherein Cv is a difference in cementite volume fraction ($C\frac{1}{2}t - C\frac{1}{8}t$), and $C\frac{1}{2}t$ and $C\frac{1}{8}t$ refer to a cementite volume fraction (%) at a center portion and a cementite volume fraction (%) at a ⅛ portion of the steel sheet in a thickness direction, respectively).

3. The high-strength cold-rolled enamel steel sheet of claim 1, wherein
the high-strength cold-rolled enamel steel sheet satisfies the following Equation (4).

$$0.07 \leq MVv \leq 0.14 \qquad \text{Equation (4):}$$

(wherein MVv is a difference in micro-void volume fraction ($MV\frac{1}{8}t - MVAv$), $MV\frac{1}{8}t$ is a micro-void volume fraction (%) at ⅛ portion of the steel sheet in a thickness direction, and MVAv is an average micro-void volume fraction (%)).

4. The high-strength cold-rolled enamel steel sheet of claim 1, wherein
the high-strength cold-rolled enamel steel sheet has a yield strength of 220 MPa or more after enamel firing heat treatment.

5. The high-strength cold-rolled enamel steel sheet of claim 1, wherein
the high-strength cold-rolled enamel steel sheet has enamel adhesion of 95% or more.

6. The high-strength cold-rolled enamel steel sheet of claim 1, wherein
the high-strength cold-rolled enamel steel sheet has a hydrogen permeability ratio of 600 sec/mm² or more.

* * * * *